US006246884B1

(12) United States Patent
Karmi et al.

(10) Patent No.: US 6,246,884 B1
(45) Date of Patent: Jun. 12, 2001

(54) SYSTEM AND METHOD FOR MEASURING AND LOCATING A MOBILE STATION SIGNAL IN A WIRELESS COMMUNICATION SYSTEM

(75) Inventors: Yair Karmi, Rishon Lezion; Anthony Weiss, Tel Aviv, both of (IL)

(73) Assignee: Sigmaone Communications Corporation, Woodland Hills, CA (US)

( * ) Notice: Subject to any disclaimer, the term of this patent is extended or adjusted under 35 U.S.C. 154(b) by 0 days.

(21) Appl. No.: 09/136,277

(22) Filed: Aug. 19, 1998

(51) Int. Cl.$^7$ ....................................................... H04B 7/00
(52) U.S. Cl. .................. 455/521; 455/456; 455/457; 342/450; 342/457
(58) Field of Search .............................. 455/9, 67.1, 115, 455/161.3, 226.1, 226.2, 440, 447, 448, 456, 457; 342/450, 457

(56) References Cited

U.S. PATENT DOCUMENTS

| | | |
|---|---|---|
| 3,573,819 | 4/1971 | Mason et al. . |
| 3,659,085 | 4/1972 | Potter et al. . |
| 4,234,924 | 11/1980 | La Vance et al. . |
| 4,599,732 | 7/1986 | LeFever . |
| 5,293,645 * | 3/1994 | Sood ..................... 455/456 |
| 5,327,144 | 7/1994 | Stilp et al. . |
| 5,592,180 | 1/1997 | Yokev et al. . |
| 5,608,410 | 3/1997 | Stilp et al. . |
| 5,666,662 * | 9/1997 | Shibuya ................. 455/456 |
| 5,809,407 * | 9/1998 | Kasperkovitz et al. ........... 455/184.1 |
| 5,903,592 * | 5/1999 | Itaya ...................... 375/200 |
| 5,959,580 | 9/1999 | Maloney et al. . |
| 5,960,355 | 9/1999 | Ekman et al. ........... 455/456 |
| 5,970,413 | 10/1999 | Gilhousen ............... 455/456 |
| 5,970,414 * | 10/1999 | Bi et al. ................. 455/456 |
| 6,021,330 * | 2/2000 | Vannucci ............... 455/456 |
| 6,047,192 | 4/2000 | Maloney et al. . |
| 6,101,178 | 8/2000 | Beal . |
| 6,108,555 | 8/2000 | Maloney et al. . |
| 6,119,013 | 9/2000 | Maloney et al. . |
| 6,127,975 | 10/2000 | Maloney . |

FOREIGN PATENT DOCUMENTS

99/04517   1/1999   (WO) .

OTHER PUBLICATIONS

Vaccero, D.D., *Electronic Warfare Receiving System* (Artech House, 1993), pp. 221–259.

* cited by examiner

Primary Examiner—William G. Trost
Assistant Examiner—Sheila Smith
(74) Attorney, Agent, or Firm—Knobbe Martens Olson & Bear LLP

(57) ABSTRACT

A communication system comprises a reference base station which collects one or more signal features of a mobile station signal. The reference base station determines a first location parameter of the mobile station signal it receives. The reference base station forwards the signal features to an auxiliary base station. Using the signal features, the auxiliary base station creates a replica of the mobile station signal as transmitted by the mobile station. The auxiliary base station correlates the replica with a same mobile station signal as received at the auxiliary base station in order to determine a second set of signal features. The auxiliary base station uses the second set of signal features to determine a second location parameter. The position of the mobile station is determined using the first and second location parameters. The process may be repeated at a plurality of auxiliary base stations and for a plurality of different location parameters in order to improve the accuracy of the determination of mobile station location.

23 Claims, 7 Drawing Sheets

SYSTEM AND METHOD FOR MEASURING AND LOCATING A MOBILE STATION SIGNAL IN A WIRELESS COMMUNICATION SYSTEM

BACKGROUND OF THE INVENTION

I. Field of the Invention

The present invention relates to communication systems. More particularly, the present invention relates to mobile station location within a wireless communication system.

II. Description of the Related Art

Wireless communication systems are becoming commonplace in modern society. One of the most scarce and complex elements of a wireless communication system is the wireless spectral bandwidth over which the wireless link operates. In order to efficiently use the segmented spectral bandwidth, modern commercial cellular communication systems are designed to reuse the allocated spectral resources. Spectral reuse is achieved by allocating the same spectral resources to multiple coverage areas spaced apart by some minimum distance. Depending on the type of system, the spectral resources may be allocated into discrete channels in the time, frequency or code domain or a combination of these. In each case, at some distance away from a first coverage area using a channel, a second coverage area reuses the same channel. The distance between the first and second coverage areas is chosen such that the signal levels emanating from the first coverage area have become sufficiently small at the second coverage area that co-channel interference between the first and second coverage areas is below an acceptable threshold level.

All cellular systems employ a power control mechanism to some extent. By using a power control mechanism, the mobile station changes its transmit signal level to compensate for variations in the path loss between the base station and the mobile station. In an ideal cellular system, the mobile station controls its power level so that within a great majority of the service area, its signal arrives at only one base station with a signal to noise ratio large enough for efficient demodulation.

In wireless communication systems, the actual location of the mobile station is often unknown. Some information about the general location of the mobile station can be easily determined. For example, in a cellular system, each base station defines a physical coverage area. In an ideal cellular system, the coverage areas of adjacent base stations abut one another to create a continuous service area. Mobile stations located within the coverage area of a base station may establish communication with the base station. When a mobile station moves past the outer boundary of the coverage area of a first base station into the coverage area of a second base station, communication with the first base station may become greatly compromised or even impossible due to the decreased signal to noise ratio at which the mobile station signal is received at the first base station. In actual systems, the coverage area of adjacent base stations overlap to some extent. Within the coverage area overlap region, a mobile station may establish communication with either base station or both base stations, depending on the communication techniques used. The coverage area overlap region can be used to execute handoff from one base station to another so that a continuous connection is provided to the mobile station as it moves about within the service area. In this way, the position of a mobile station can be limited to the coverage area corresponding to the base station which is currently providing service to the mobile station. However, base station coverage areas can be relatively large such as several miles in diameter. In many emergency situations, such imprecise location information is nearly useless.

Several techniques have been developed in order to aid in locating a mobile station in a wireless system using one or more location parameters. For example, the angle of arrival, time of arrival and time difference of arrival have all been used as location parameters to determine the location of a mobile station in a wireless system.

FIG. 1 is a diagram illustrating an angle of arrival for a wireless mobile station 102. The angle of arrival is an indication of the direction from which the signal from the mobile station 102 is received at the base station 100. The measured angle of arrival designates the location of the mobile station on a line of bearing. The angle of arrival does not provide any information about the distance between the base station 100 and the mobile station 102.

An interferometer is one means by which the angle of arrival may be measured. An interferometer determines the angle of arrival based on a phase difference of the signal arriving at two or more antennas elements.

A beam forming method can also be used to measure the angle of arrival. A beam forming method determines the angle of arrival based on a best match between the amplitude and phase response of an antenna array and the amplitude and phase signal measurements for each antenna element of the array.

Super-resolution techniques may also be used to determine the angle of arrival. Super-resolution techniques determine the angle of arrival based on a determination of the multipath model and signal statistics, not knowing the signal itself. Academic efforts refining these and other techniques are currently in progress.

The time of arrival determines a circle upon which the mobile station 102 may be found with relation to the base station 100 as shown in FIG. 2. The radius of the circle is calculated by multiplying the delay between the transmission of a signal from the mobile station 102 and reception of the signal at the base station times the speed of light. (radius=c*delay). The time of arrival does not provide any information concerning the angle of the mobile station 102 with respect to the base station 100. In a typical prior art system, the base station 100 sends a signal to the mobile station 102 which repeats the signal as soon as it is received. The delay between the transmission and reception of the signal is determined by cross-correlating the transmitted signal and the received signal at a series of time offsets. The cross-correlation exhibits a peak at the time offset equal to the round trip delay or twice of the one-way transmission delay time. The transmitted signal is often called a reference signal. A reference signal is only available when the base station has a priori knowledge concerning the data content of mobile station signal.

FIG. 3 is a diagram illustrating a time difference of arrival determination for a wireless mobile station 102 with respect to a base station 100A and a base station 100B. The difference in the time of arrival of a signal received at two base stations determines a hyperbola upon which the mobile station 102 is located. In a typical prior art system, the mobile station 102 transmits a signal which is received by both base stations 100A and 100B. Each base station determines the absolute time at which the signal is received. By comparing the difference, a relative distance between the two base stations is determined. For example, by comparing the time difference of arrival, the location of the mobile station 102 is determined to be about 1 kilometer closer to the base station 102B than the base station 102A. Alternatively, received signals from base stations 100A and 100B are brought to a common processing site where they are cross-correlated to yield directly the difference in propagation time from the mobile station to the base stations.

As a signal propagates between the base station and the mobile station over the wireless channel, it is attenuated by and reflects from objects in the field. At the base station, the various reflected propagations are offset in time from one another due to the differences in the path lengths which the signals travel. For example, FIG. 4 is a diagram showing three different propagation paths of a signal transmitted by the mobile station and received by the base station. Typically, the first signal to arrive has the largest amplitude and travels a relatively direct path from the mobile station to the base station. However, this is not always the case, especially when no viable direct path is available. In addition, depending on the phase at which the multipath signals arrive at the base station, the multipath signals may add destructively. The destructive addition of multipath signals may result in signal fading meaning that the combined signal strength of two or more propagation paths is less than the sum of the signal strength of each signal alone.

Multipath is the major source of error in the measurement of an angle of arrival, time of arrival or time difference of arrival location parameters. Multipath distorts the result of the cross-correlation as well as the angle detection processes, thus, limiting the accuracy of the location parameter determination. The limited accuracy of the location parameters inhibits an accurate determination of the exact position of the mobile station. For example, when no viable direct path from the mobile station to the base station is available, the resulting round trip delay measurement reflects a greater distance than the actual distance between the mobile station and the base station. Also, when no viable direct path from the mobile station to the base station is available, the angle of arrival measured by the base station reflects one of the multipath angles of arrival which is seldom reflective of the actual location of the mobile station. Even when a direct path is available, the presence of the multipath signals may distort the detection process causing errors in the measured location parameters.

In addition to multipath, the accuracy of the location parameters measurements is limited by the signal to noise ratio at which the signals are received at the base station. Under ideal conditions of additive white Gaussian noise (AWGN), the variance of the accuracy of the location parameters is limited by the Cramer-Rao bound. In deployed systems, the noise is actual a combination of thermal AWGN, co-channel interference from other mobile stations using the same channel and spurious interference from other man-made sources.

Using two or more of measurements of the location parameters discussed above, a more precise location of the mobile station may be determined. Assuming variations in height within the area of interest do not constitute a serious problem requiring an increase in the number of location parameters measurements, the location of the mobile station may be determined according to Table I.

TABLE I

| Location Parameters Measured | Minimum No. of Base Stations |
|---|---|
| Angle of Arrival and Time of Arrival | 1 |
| Angle of Arrival and Time Difference of Arrival | 2 |
| Angle of Arrival | 2 |
| Time of Arrival | 2 |
| Time Difference of Arrival | 3 |

The mobile station location can be determined based on measuring the angle of arrival and the time of arrival at one base station. For example, imagine superimposing FIG. 1 over FIG. 2. The intersection of the line of bearing with the circle determines the location of the mobile station.

The mobile station location can be determined by measuring the angle of arrival at a first base station and the time difference of arrival between a first and a second base station. For example, imagine superimposing FIG. 1 over FIG. 3. The intersection of the line of bearing with the hyperbola determines the location of the mobile station.

The mobile station location can be determined by measuring the angle of arrival from two base stations as shown in FIG. 5. In FIG. 5, both the base station 100A and the base station 100B determine an angle of arrival for the mobile station 102. The intersection of the lines of bearing defined by the measured angle of arrivals determines the location of the mobile station 102.

The mobile station location can be determined by measuring the time of arrival from two base stations as shown in FIG. 6. In FIG. 6, both the base station 100A and the base station 100B determine a time of arrival for the mobile station 102. The two intersection points of the circles defined by the measured time of arrival radii determine two possible locations of the mobile station 102. Obviously some other mechanism must be used to eliminate one of the possible location points in order to precisely determine the mobile station location.

In a similar manner, the mobile station location can be determined based on the measuring the time difference of arrival at three base stations as shown in FIG. 7. In FIG. 7, the base stations 100A, 100B and 100C determine a time difference of arrival for the mobile station 102. The two intersection points of the resulting hyperbolas determine two possible locations of the mobile station 102. However, in most cases, one of the intersection points is far removed from the actual coverage areas of the three base stations and may be easily identified as an erroneous location.

The error in location determination, based on the minimum number of measurements which are required according to the various techniques shown in Table I, may be quite large even when the error in the measurements is relatively small. For this reason, benefits can obtained by combining techniques and making additional measurements. The additional information gained through the additional measurements reduces the error in location determination caused by errors in the location parameter measurements. The accuracy of a location system may be significantly improved by providing measurements from additional base stations, even when the additional measurements are also subject to error. For example, in FIG. 8, angle of arrival and time of arrival measurements are performed at two base stations 100A and 100B. From this information, four different estimates of the location of the mobile station 102 may be determined. By combining the results, a more accurate determination of the position of the mobile station 102 may be determined. More information concerning one such system may be found in U.S. Pat. No. 5,592,180 entitled "DIRECTION FINDING AND MOBILE LOCATION SYSTEM FOR TRUCKED MOBILE RADIO SYSTEMS."

However, in most cases, practical conditions impose a threshold on a minimum signal to noise ratio at which the mobile station signal is received at the base station in order for the signal to be detected and a meaningful location parameter to be measured. Base stations which do not receive the mobile station signal with at least the threshold signal to noise ratio cannot provide useful location parameter measurements. The signal to noise ratio at which the mobile station signal reaches the base station is a function of the distance between the base station and the mobile station as well as other factors. As a mobile station moves about within a cellular system, typically only one base station at a time receives the mobile station signal at a relatively high signal to noise ratio. The remaining base stations receive the mobile station signal at a relatively low signal to noise ratio. The low signal to noise ratio affects the accuracy of the location parameters measured by these base stations or prevents measurement altogether. In turn, the poor location parameters yield faulty location determinations or no location determinations when the minimum number of required location parameters are unavailable.

Therefore, there is a need in the industry to provide an extended measurement range and more accurate position location within a cellular system.

SUMMARY OF THE INVENTION

The method and apparatus measure a mobile station transmission at a base station even when poor signal conditions prevent the unaided detection of the mobile station signal. In one embodiment, the reference base station collects a first set of one or more signal features corresponding to a mobile station signal and forwards them to an auxiliary base station. The auxiliary base station creates a replica of the mobile station signal in response to the first set of signal features. The auxiliary base station correlates the replica with the same mobile station signal received at the auxiliary base station and determines a second set of one or more signal features. A first location parameter is determined using the first set of signal features. A second location parameter is determined using the second set of signal features. A position of the mobile station is estimated using the first and second location parameters.

BRIEF DESCRIPTION OF THE DRAWINGS

The features, objectives, and advantages of the invention will become more apparent from the detailed description set forth below when taken in conjunction with the drawings wherein like parts are identified with like reference numerals throughout and wherein.

DETAILED DESCRIPTION OF THE INVENTION

When an emergency call is received, it is often the case that the caller does not know his precise location. Especially in those cases where the caller may be partially incapacitated, locating the source of the call can have major consequences in life threatening situations. As noted above, many techniques for determining location have been developed. These techniques rely on the measurement of a mobile station signal at one or more base stations. As the number of measurements is increased and the number of base stations at which the measurements are made is increased, the precision with which the mobile station may be located increases.

A problem is encountered in actual systems when one attempts to make measurements in a plurality of base stations. In typical cellular systems, within a substantial portion of the service area, a mobile station is within the coverage area of only one base station. It is only at those times when the mobile station is located within an overlap region that it is capable of establishing communication with more than one base station using the standard communication techniques of the system. Unless the mobile station is within the coverage area of a base station, the signal to noise ratio at which the base station receives the mobile station signal is extremely low. The low value of the signal to noise ratio may make it impossible to measure the location parameters or, at best, may result in highly inaccurate measurements. When the location techniques illustrated above are executed based on inaccurate location parameters, the resulting predicted location is highly inaccurate.

Figure 1:
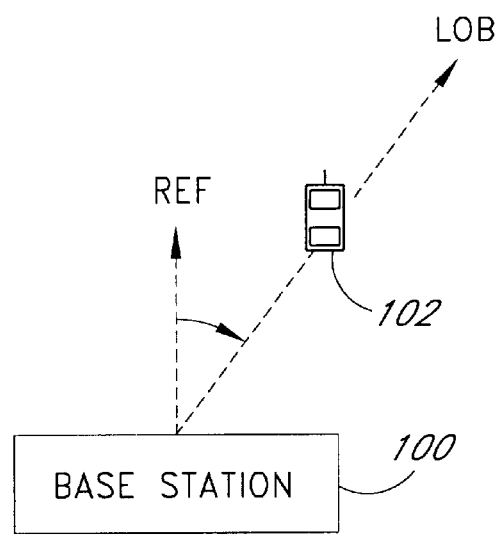
FIG. 1 is a diagram illustrating an angle of arrival measurement.
Figure 2:
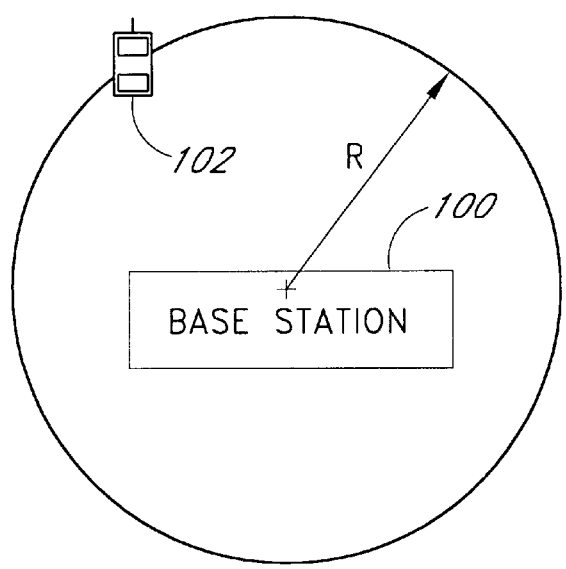
FIG. 2 is a diagram illustrating a time of arrival measurement.
Figure 3:
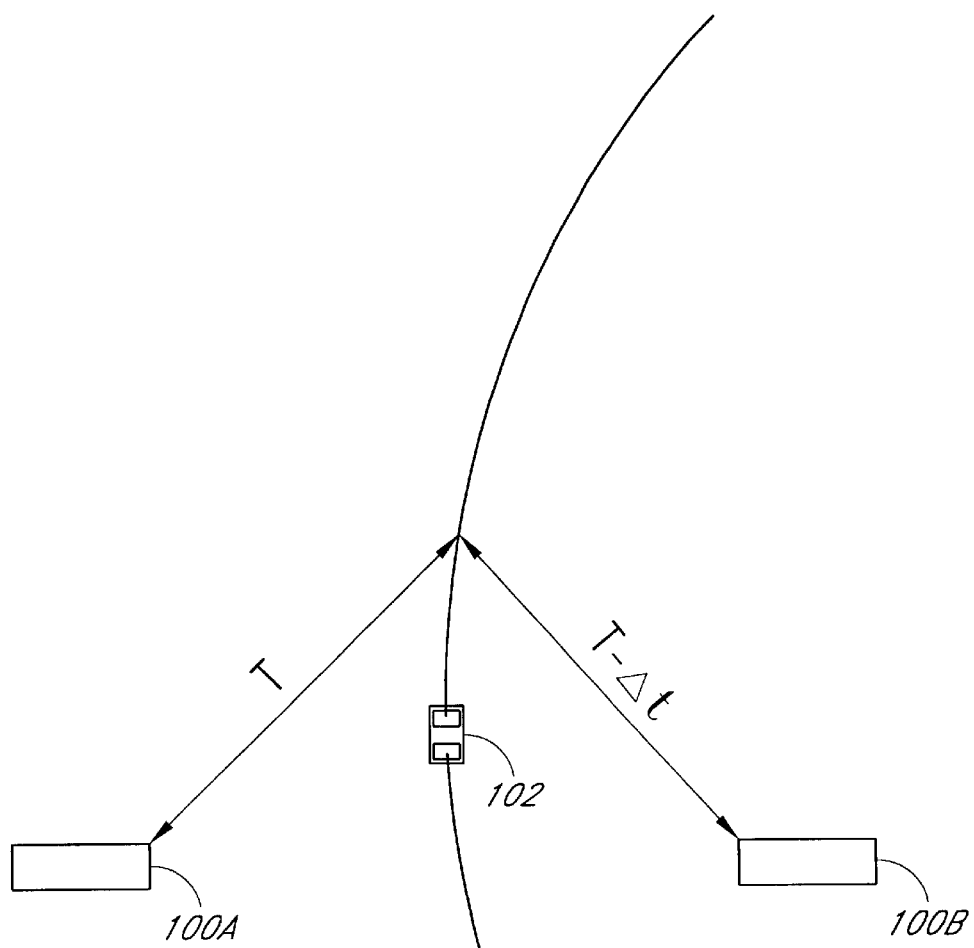
FIG. 3 is a diagram illustrating a time difference of arrival measurement.
Figure 4:
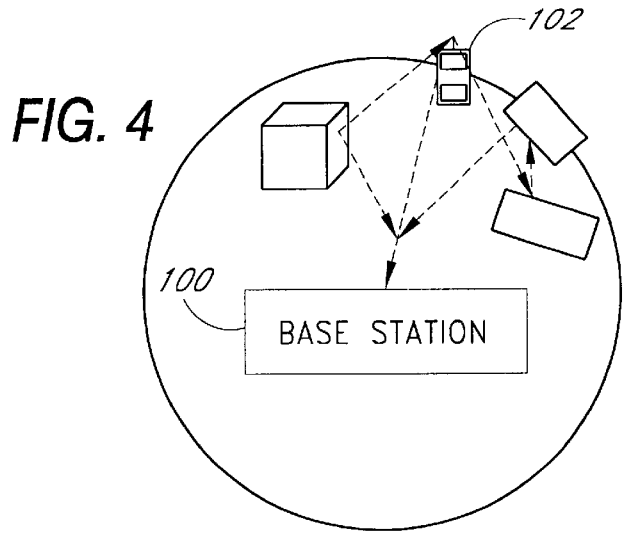
FIG. 4 is a diagram illustrating a multipath.
Figure 5:
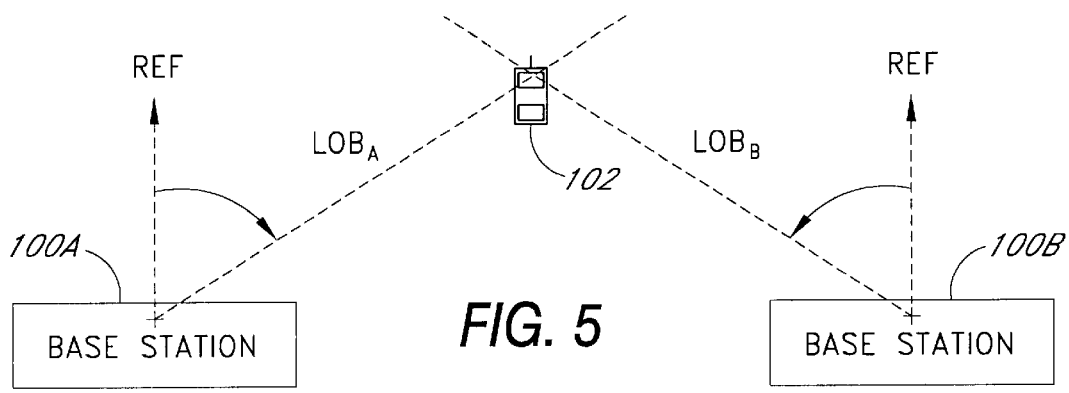
FIG. 5 is a diagram illustrating position location using angle of arrival.
Figure 6:
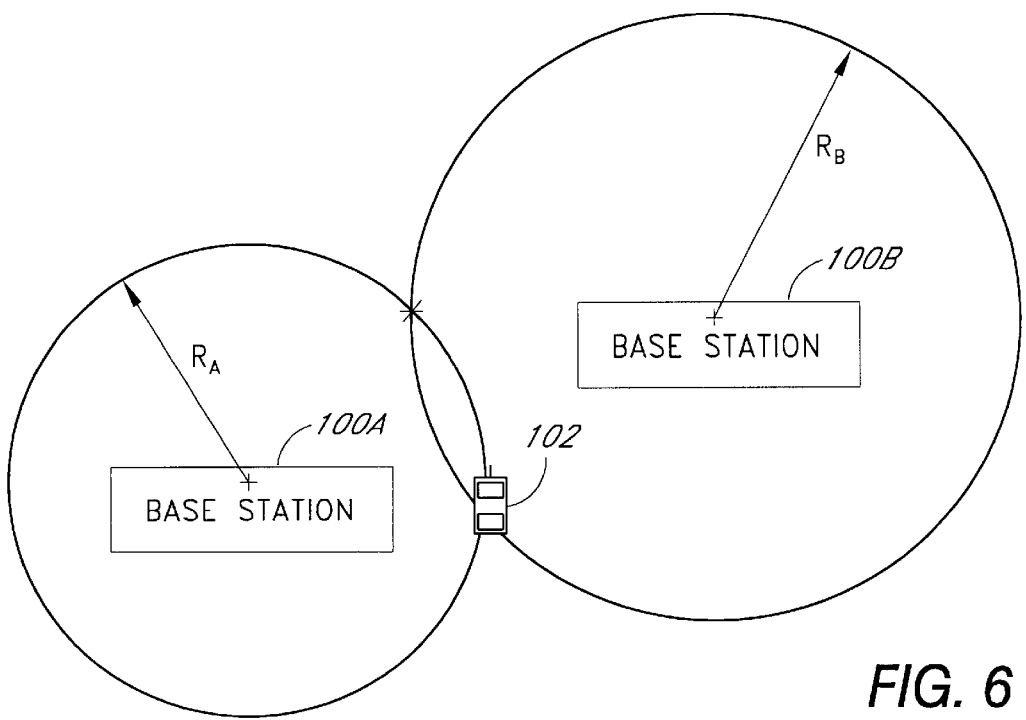
FIG. 6 is a diagram illustrating position location using time of arrival.
Figure 7:
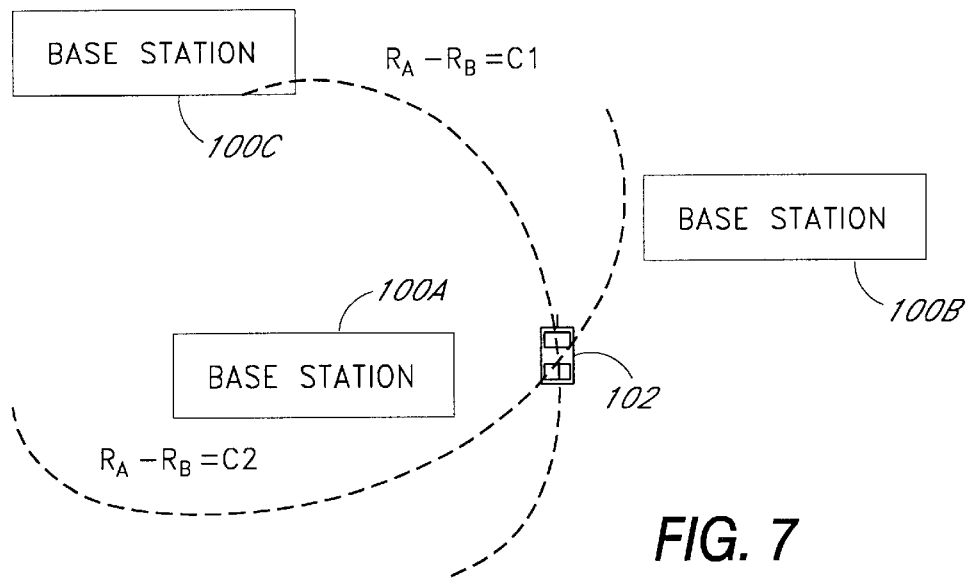
FIG. 7 is a diagram illustrating position location using time difference of arrival.
Figure 8:
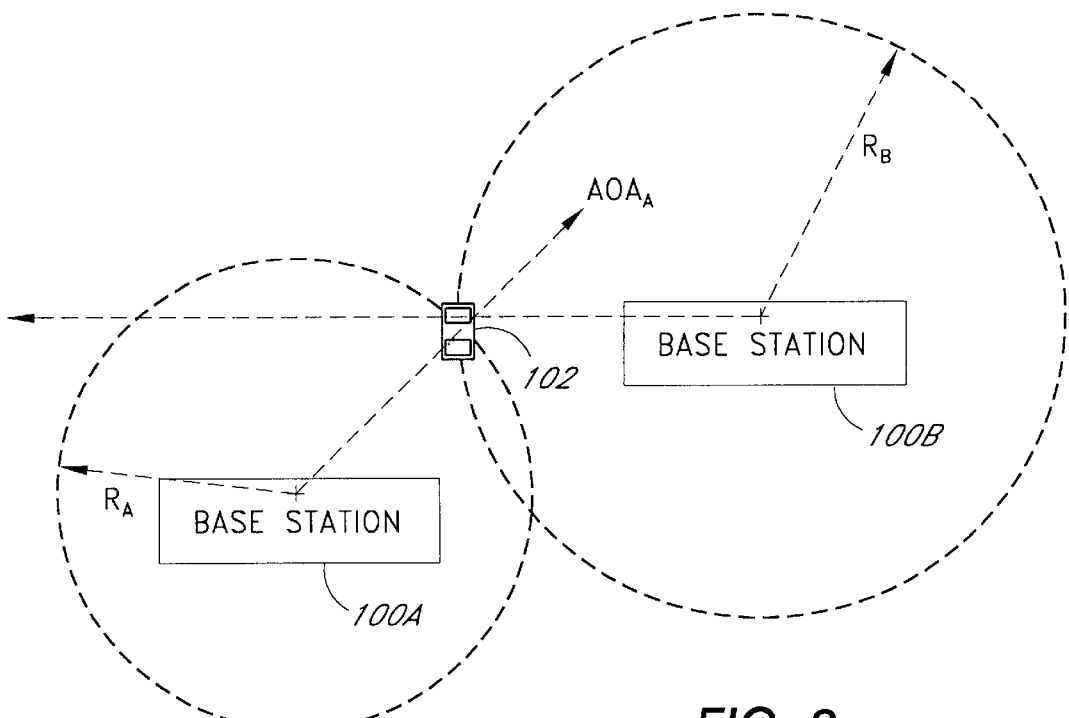
FIG. 8 is a diagram illustrating position location using angle of arrival and time of arrival.
Figure 9:
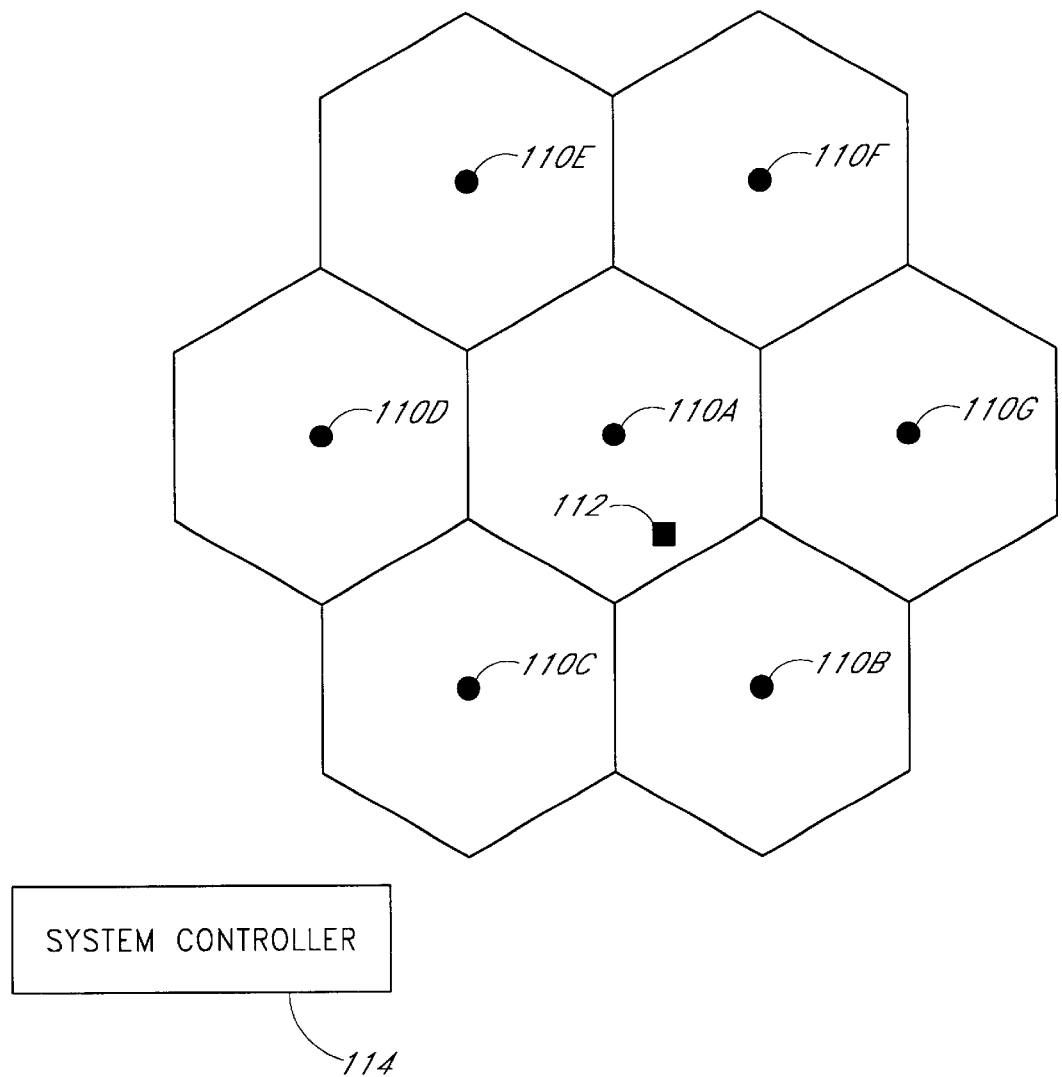
FIG. 9 is a representative drawing showing seven base stations and corresponding coverage areas arranged in an ideal hexagonal configuration.

FIG. 9 is a representative drawing showing seven base stations 110A–110G and corresponding coverage areas arranged in an ideal hexagonal configuration. In actual systems, the coverage areas are affected by the physical environment in which they are placed and the coverage areas are irregular rather than hexagonal in shape. In addition, in actual systems, some of the base stations comprise multiple sectors. The multiple sectors divide the coverage area of a base station into two or more sub-coverage areas. The sectors each comprise independent transmit and receive systems. The use of sectors reduces the interference between mobile stations operating within different sectors of the same base station. The teachings of the invention can be equally applied to each sector of a base station and to unsectored base stations. Therefore, the term "base station" as used herein refers to a sector of a multisectored base station, a multisectored base station or a unsectored base station.

A mobile station 112 is shown within the coverage area of the base station 110A and we can assume that the base station 112 receives the mobile station signal at a signal to noise ratio sufficient to support communication. The mobile station 112 is located close to the coverage overlap area between the coverage area of the base station 110A and the coverage area of the base station 110B. Therefore, we can assume that the base station 110B could detect the mobile station signal at a relatively low signal to noise ratio although during normal operation it does not attempt to do so. The signal to noise ratio of the mobile station signal received at the base stations 110C–110G is very low, such as, for example, below 0 decibels (dB) and the base stations 110C–110G would have difficulty even detecting and demodulating the mobile station signal under normal operating conditions.

The base stations 110A–110G of FIG. 9 are coupled to and controlled by a system controller 114. The system controller 114 co-ordinates the operation of the base stations 110A–110G such as by directing handoff of mobile station communication between base stations and providing an interface between the cellular system and the public telephone system. The system controller 114 may be coupled to the base stations 110A–110G using any one of a series of well known networking techniques such as a system operating under the transmission control protocol/internet protocol (TCP/IP).

Based upon the signal to noise ratio received at the base station 110A, the base station 110A can demodulate the mobile station signal according to the communication techniques of the system. For example, the system may be a time division multiple access (TDMA) system, code division multiple access (CDMA) system, a hybrid frequency hopping and TDMA system such as a Global System for Mobile Communications (GSM) system, a frequency modulated (FM) system such as Advanced Mobile Phone Service (AMPS) or Narrowband AMPS (NAMPS) or a system employing a variety other modulation and access schemes now existing or later developed.

In prior art systems, the mobile station transmits a special signal which is easily detectable by the base station. The special signal comprises known data which improves the probability of accurate reception of the signal at the base station based on the use of a reference signal. In the preferred embodiment of the present invention, no changes are required in the mobile station to locate the mobile station so that location determination may be implemented within a working system and without modifying existing mobile stations. For this reason, the invention may be implemented based upon transmission of an unknown signal from a mobile station which has not been modified to accommodate position location.

In another embodiment, the mobile station transmits a predetermined signal. However, in the process of transmission, the environment operates to affect the signal and, therefore, the signal features of the mobile station signal are not known at the base station even if a predetermined signal is transmitted by the mobile station. For example, delay is introduced by transmission over the wireless link. The delay is not a known signal feature of the mobile station signal as received at the base station even if the mobile station sends a predetermined location beacon. In this way, even if the mobile station transmits a predetermined signal, the teachings of this invention are applicable and increase system performance either through increased accuracy or reduced processing power.

In order to determine the location of the mobile station 112, the system controller 114 may determine that the base station 110A is currently servicing the mobile station 112 and command it to begin to collect certain signal features of the mobile station signal. Because the base station 110A receives the mobile station signal at a fairly high signal to noise ratio, it can accurately determine the data content of the signal. In digital systems, the communication technique often comprises an error detection process, an error correction process or both which further increase the accuracy of the data content determination. In this way, the base station 110A acts as the reference base station.

One or more signal features may be determined by the reference base station. For example, one signal feature may be the data content of the signal. Other signal features determined by the reference base station may be phase trajectories, frequency deviations, frequency variations along the received signal, Doppler shift, the time of reception of a clearly identified portion of the received signal, relative phase states, power level measurements and other parameters which allow generation of a replica of the signal received by the reference base station or a reduction in the processing power used in the correlation process. For example, using a local time and frequency reference, the reference base station may determine the time of arrival, frequency and phase deviations along the received signal. Characteristics of the mobile station signal may vary due to variations in implementation circuitry among models and variations in performance of the particular components within a mobile station. The signal features may be determined based upon information regarding the model, type or manufacturer of the mobile station. The means and methods by which signal features are determined at relatively high signal to noise ratios are well known in the art. For example, the area of signal classification has been studied in relation to electronic warfare. Further information regarding signal classification can be found in K. Fukunaga, *Introduction to Statistical Pattern Recognition* (Academic Press, 1990) and D. D. Vaccaro, *Electronic Warfare Receiving Systems*, (Artech House, 1993) which are incorporated herein by reference.

The system controller 114 also determines a set of auxiliary base stations 110B–110G which have a reasonable probability of measuring the mobile station signal if provided with the signal features. Typically, the determination of an initial set of auxiliary base stations is based upon the known physical relationship of the coverage areas of the auxiliary base stations relative to the reference base station.

The reference base station 110A forwards the signal features to the system controller 114. The signal features are then distributed to the set of auxiliary base stations 110B–110G. Using the signal features, the auxiliary base stations 110B–110G create an accurate replica of the mobile station signal. The process of creating a replica of signal based upon known signal features is well known in the art. For example, in one simple case, the replica is created based solely upon the data content and generated in the same manner in which the original signal is created at the mobile station. Other signal features may be integrated into the replica based upon well known signal processing techniques. For example, a replica of a signal may be created from mathematical parameters of the signal using Manchester-coded frequency shift keying (FSK.) Further information concerning creation of signal replicas may be found in William C. Y. Lee, *Mobile Cellular Telecommunications Systems* (McGraw-Hill, 1989) and Edward A. Lee and David G. Messerschmitt, *Digital Communications*, (Kluwer Academic Publishers, 1988) which are incorporated herein by reference.

The auxiliary base stations 110B–110G correlate the replica to the received mobile station signal. The correlation process is a linear operation and, therefore, the signal features and corresponding location parameters are preserved. The extraction of signal features through correlation is well known in the art. For example, in the prior art, pilot signals are detected based upon correlation with a known pilot sequence. Further information concerning signal detection and correlation can be found in Andrew J. Viterbi, *CDMA: Principles of Spread Spectrum Communications*, (Addison Wesley, 1995) and V. K. Garg, K. Smoklik, J. E. Wilkes, *Applications of CDMA in Wireless/Personal Communications*, (Prentice Hall, 1997) which are incorporated herein by reference.

The signal features output by the correlation process are used to determine a set of location parameters requested by the system controller 114. Typically, only some of the auxiliary base stations 110B–110G can measure the mobile station signal even with the use of the signal replica. For example, in this case, we can assume that the auxiliary base stations 110B–110D and 110G are able to measure the mobile station signal to provide location parameters. Thus, the coverage areas of the auxiliary base stations 110B–110D and 110G, for the purpose of measuring location parameters, is significantly increased over the coverage area for servicing mobile station communication. The system controller 114 may stop sending signal features to the auxiliary base stations 110E and 110F and they may stop attempting to generate location parameters if they are unable to measure the mobile station signal after some period of time, in order to save communication bandwidth of the system controller 114. As the mobile station 112 continues to move about within the service area, a new reference base station as well as new auxiliary base stations may be selected.

The collection of location parameters at more base stations increases the accuracy with which the mobile station can be located. Even for the base station 110B that receives the mobile station signal above the minimum acceptable threshold for detection, the use of the known signal features to measure the mobile station signal improves the accuracy of the measured location parameters and may reduce the required processing power. In an alternative embodiment, the signal features are only provided to a subset of auxiliary base stations which are unable to detect the mobile station signal and the base station 110B measures the mobile station signal without the benefit of the signal features.

The transfer of a reference signal to an auxiliary base station may be achieved by sampling the mobile station signal at the reference base station and transferring the samples to the auxiliary base station. The rate of data transfer will be based upon the bandwidth of the mobile station signal. For example, if the bandwidth of the mobile station signal is 30 kilohertz (kHz), such as is the case for AMPS systems, at least 60 kilosamples per second (ksps) must be transferred to the auxiliary base station in order to achieve Nyquist sampling. These high sample rates may correspond to between 480 and 960 kilobits per second (kbps) or more of data depending on the precision with which the samples are collected and the amount of overhead associated with the transfer. The communication bandwidth required to transfer such large amounts of data may be relatively expensive. In addition, executing a correlation processes with the actual samples yields less accurate results than with a signal replica created based on the signal features because the signal features are developed after the reference base station has decoded and performed error detection or correction on the signal. Thus, the signal replica may be a more accurate prediction of the mobile station signal received at the auxiliary base station than the actual data samples.

According to the invention, an accurate replica of the reference signal can be created at the auxiliary base stations based upon the signal features. The signal features can be transferred to the auxiliary base stations using an order of magnitude less data than the samples. The extent to which the creation of a replica of the mobile station signal requires additional signal features aside from its data content (either analog or digital) depends upon the type of signal. For example, the standard which defines mobile station transmissions in an AMPS system is fairly imprecise meaning that two mobile station signals generated by compliant mobile stations may vary significantly even if they are transmitting the same information. Therefore, other signal features such as phase trajectories, amplitude trajectory and encoding imbalance may be used to more accurately create a replica of the signal than could be created based solely on the data content. More modern digital systems specifications (such as IS-95, IS-136 and the GSM specification) impose more stringent standards in order to more efficiently use the available communication bandwidth. Thus, given the cost limitations of handset implementation and the variations among manufacturers, in many cases, signal features other than the data content are useful in creating a replica of the mobile station signal. In addition, well known compression techniques can be used to further reduce the volume of data which is transferred between the base stations.

Preferably, the base station with the best reception condition is used as the reference base station to determine the signal features. For example, the base station which receives the mobile station signal with the highest signal to noise ratio can extract the data with the lowest error rate. The extraction of other signal features is also sensitive to signal to noise ratio. Typically, the base station with the best reception is the base station which is currently servicing the mobile station. However, as long as a base station, whether the servicing base station or another base station, receives the mobile station signal with a sufficient signal to noise ratio to collect the signal features, it may be used as the reference base station. In certain kinds of systems such as CDMA systems, more than one base station may concurrently service the mobile station during the handoff process. In such a case, either base station may be used to determine the signal features or the combined signal features may be determined based upon information from each base station, or the signal features detected at both base stations may used by the auxiliary base station.

The co-channel interference from other mobile stations reusing the same channel at a distant base station is likely to be higher at the auxiliary base stations than at the reference base station. According to prior art detection techniques, an auxiliary base station cannot detect a mobile station signal in the presence of strong co-channel interference. The detection of a signal according to the prior art includes a determination of the data content of the signal. According the invention, such detection of data is not necessary and the auxiliary base station need only measure the mobile station signal using the correlation process. The use of known signal features at the auxiliary base stations to measure the mobile station signal increases the performance to the extent that in many cases a mobile station signal can be measured according to the invention even if there is co-channel interference having a higher signal to noise ratio than the desired signal. In addition, the invention decreases the probability of large errors due to detecting co-channel interference instead of the desired signal.

Collection of the signal features of the signal transmitted by the mobile station 112 within the servicing base station 110A and dissemination of these signal features to the auxiliary base stations 110B–110G allows the auxiliary base stations 110B–110G to extract accurate location parameter measurements for use in the location determination. In comparison to detection of the mobile station signal without the signal features, the processing gain according to the invention may increase performance of the auxiliary base stations by as much as 3, 5, 8 or 10 to 30 decibels (dB) or higher depending on the type of signal, the signal features collected and other factors.

In addition, the correlation process requires less processing power when certain signal features of the signal being measured are known. For example, in a CDMA system, the incoming data sequence is correlated with a set of possible data values. The energy from each correlation is compared with the others to determine which value of the set of possible data values most likely represents the data. If the data sequence is known, correlation with the other possible data values and comparison of the resulting energy values is not necessary and the correlation process is executed only for the known data value. Elimination of these other processes greatly reduces the processing power needed to measure the mobile station signal.

The processing power required to measure the mobile station signal may be further reduced by limiting the search range over which the base station attempts to correlate the mobile station signal with the replica. For example, the range in time, frequency and phase over which the auxiliary base station correlates the mobile station signal to the replica may be limited based upon to the location of its antennas relative to the reference base station's antennas. The use of known signal features at the auxiliary base station to limit the search range also reduces the probability of the auxiliary base station generating location parameters with large errors, i.e. a false alarm due to random noise or interference. By limiting the search range, false alarms outside of the search range may be eliminated. For example, the Doppler shift of the mobile station signal as perceived by the reference base station is related to the motion of the mobile station relative to auxiliary base stations. The relative Doppler shift between base stations is related to the location of the mobile station and its speed vector. Therefore, the range of the possible Doppler shifts searched in the auxiliary base stations may be limited to a set of possible or likely values. Likewise, the time of arrival of the signal to an auxiliary base station is bounded by the time of arrival of the signal at the reference base station and the distance between the auxiliary base station and the reference base station. Therefore, the range of arrival times over which the auxiliary base station attempts to correlate the mobile station signal to the replica may be limited based on time of arrival data collected at the reference base station. In many cases, limiting the processing power is the difference between a practical system and a unfeasibly complex system. In fact, the use of signal features extracted at a first base station to limit the range over which another base station searches for the mobile station signal can greatly improve system performance and reduce the required processing power even if a different mechanism than the one disclosed herein is used to extract the location parameters at the auxiliary base station.

Moreover, the use of known signal features at the auxiliary base stations to measure the mobile station signal facilitates the use of longer integration periods, thus, increasing the observed signal energy and providing additional processing gain. The signal energy measured is equal to the product of the instantaneous power in the signal and the observation time. However, if the signal power is too small, the signal is not detectable and increasing the observation time does not provide an accurate measure of the energy. The use of known signal features at the auxiliary base station to measure the mobile station signal increases the processing gain at the auxiliary base station and allows smaller signal powers to be accurately measured, which allows the use of integration to further increase the processing gain.

In this way, a system incorporating the invention has an extended range and improved accuracy location ability. In addition, a system incorporating the invention may be designed using less processing power than the prior art. Thus, a more precise and accurate location of a mobile station may be determined which is particularly useful in case of emergency calls.

Figure 10:
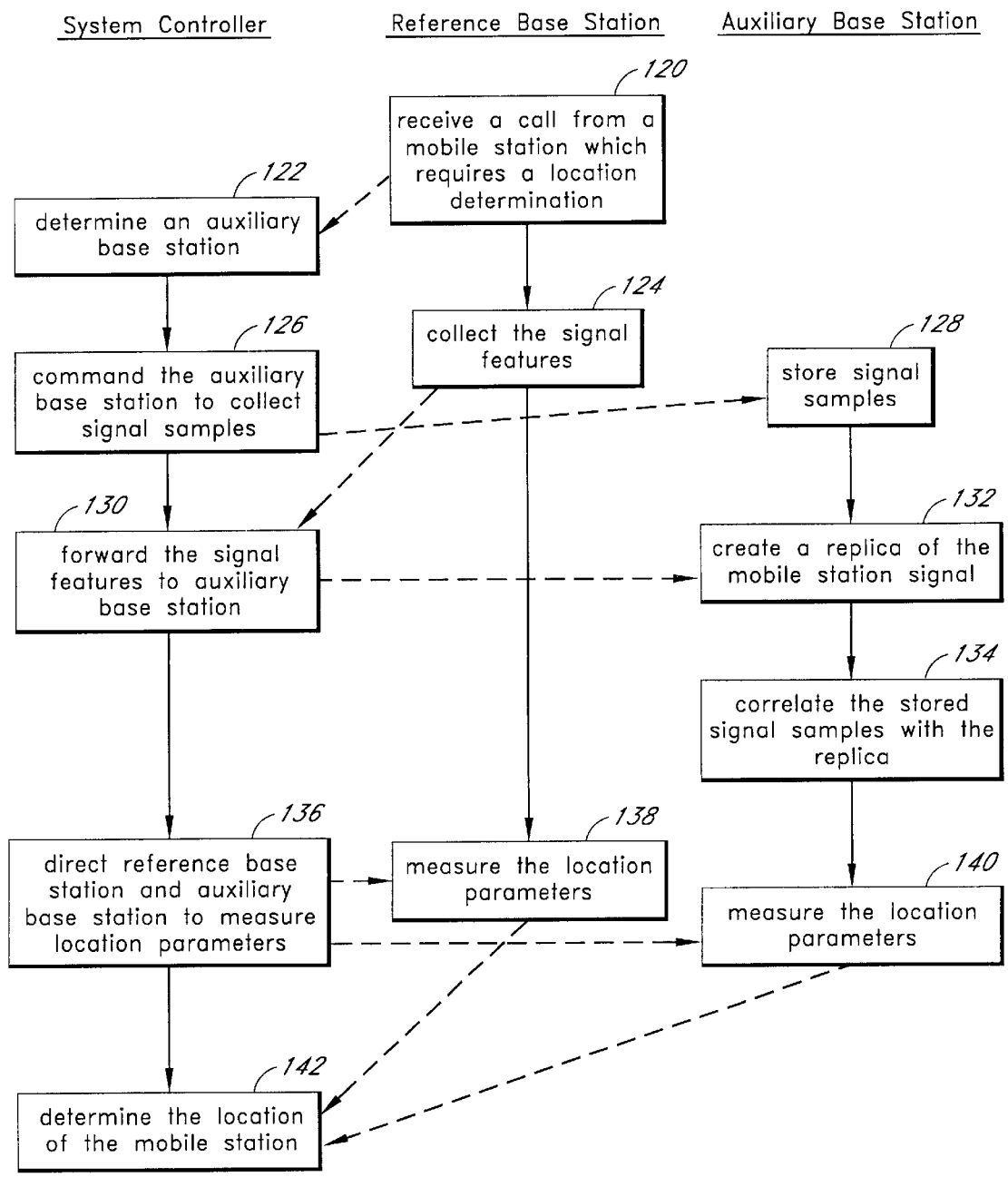
FIG. 10 is a flow chart showing exemplary operation in accordance with the invention.

FIG. 10 is a flow chart showing exemplary operation of a system controller, a reference base station and an auxiliary base station in accordance with the invention. In block 120, the reference base station receives a call from a mobile station which requires a location determination and notifies the system controller. In block 122 the system controller determines an auxiliary base station which may assist in the location determination. The determination may be made based upon the identity of the base station and sector currently servicing the mobile station. In block 124, the reference base station begins to collect the signal features and forwards them to the system controller.

In block 126, the system controller commands the auxiliary base station to begin collecting data samples which may correspond to the same signal for which the reference base station is collecting signal features. In another embodiment, the auxiliary base station may continually collect samples and discard them after a certain period of time if no corresponding signal features are received. In block 128, the auxiliary base station samples the incoming signal either by sampling the channel frequency in a narrowband system or by sampling the channel spectrum in a wideband system. For this purpose, any sampling algorithm that meets the Nyquist Sampling Theorem requirements for preservation of information is acceptable. Alternatively, a standard pulse code modulation (PCM) algorithm may be used. Because in the preferred embodiment these samples are not transferred to the system controller, it is not necessary to limit the amount of data collected in order to preserve the communication bandwidth of the system. The samples may be stored in random access memory or other temporary storage medium.

In block 130, the system controller receives the signal features from the reference base station and forwards them to the auxiliary base station. In block 132, the auxiliary base station creates a replica of the mobile station signal using the signal features. In block 134, the auxiliary base station correlates the stored samples with the replica of the mobile station signal.

In block 136, the system controller directs the reference base station and the auxiliary base station to measure the location parameters. In blocks 138 and 140 respectively, the reference base station and the auxiliary base station measure the location parameters and forward them to the system controller. In block 142, the system controller determines the location of the mobile station based upon the location parameters received from the base stations. For example, the system controller may determine the mobile station location using one of the techniques discussed above. The process may be executed at a plurality of auxiliary base stations and for a plurality of different location parameters in order to improve the accuracy of the determination of mobile station location.

Figure 11:
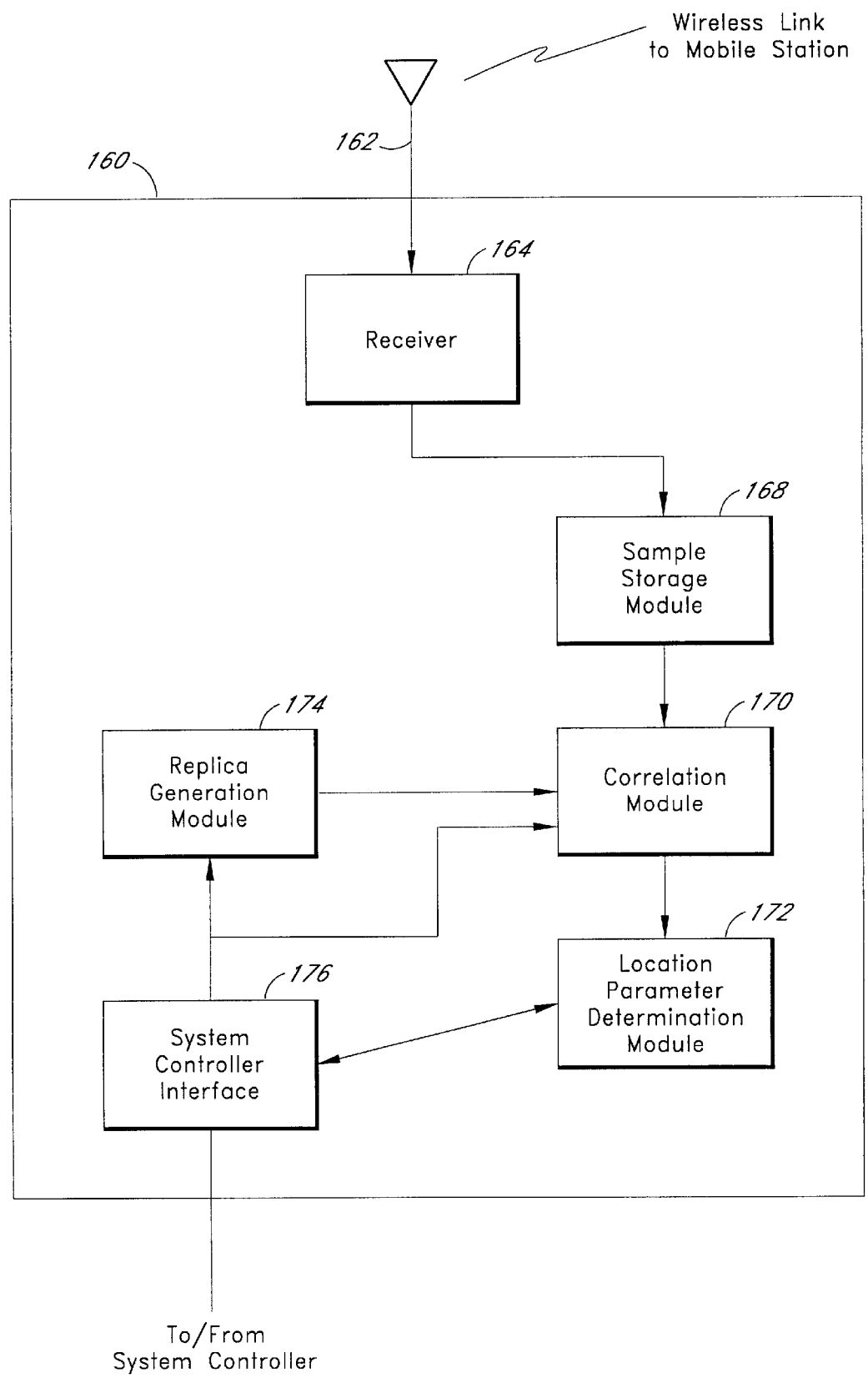
FIG. 11 is a block diagram of an auxiliary base station.

FIG. 11 is a block diagram of an exemplary embodiment of an auxiliary base station 160. In the embodiment shown in FIG. 11, the measurement process modules do not share a common receiver with the equipment which services mobile stations within the coverage area of the base station. In another embodiment, the measurement process modules may share receiver circuitry and antennas with the equipment which services mobile stations communications within the coverage area. In this example, the auxiliary base station 160 is designed to receive a wireless link signal which has been modulated using a modulation scheme such as a TDMA, CDMA or GSM type system. An antenna 162 receives signals from the mobile station over a wireless link. The auxiliary base station 160 may also comprise an antenna array in order to make an angle of arrival measurement or a special antenna for time of arrival measurements or both. The auxiliary base station 160 may share the antennas of a fully functional base station. The wireless radio frequency signals are converted to digital bits by a receiver 164. The receiver 164 outputs the digital bits to a sample storage module 168. In response to a command from the system controller, the sample storage module 168 stores the digital samples until the corresponding signal features are received. In an alternative embodiment, the sample storage module 168 stores digital samples of all applicable channels with no specific control and simply discards the unused samples after some period of time. A system controller interface 176 couples the auxiliary base station 160 to a system controller (not shown.) When the signal features are received via the system controller, the system controller interface 176 forwards them to a replica generation module 174. The replica generation module 174 creates a replica of the mobile station signal and outputs it to a correlation module 170. The correlation module 170 multiplies the stored samples by a variety of time and frequency adjusted versions of the replica. In an alternative embodiment, a single version of the replica is multiplied by a variety of time and frequency adjusted versions of the received signal. The correlation module 170 may use one or more of the signal features to limit the range of time, frequency and other parameters over which correlation is attempted. The correlation module 170 then selects the highest energy results of the multiplication process to determine a second set of signal features for the mobile station signal as received at the auxiliary base station. Alternatively, this step may incorporate a well known multipath processing technique. The second set of signal features is output to the location parameter determination module 172. Based upon a request from the system controller, the location parameter determination module 172 determines the location parameters and forwards them to the system controller interface 176 for transmission to the system controller. The modules may be software or hardware components or a combination of software and hardware. The modules may be implemented as software code running on a standard microprocessor. The modules may be embodied in one or more application specific integrated circuits (ASIC.)

A myriad of alternative embodiments will be readily apparent to one skilled in the art based upon examination of the above description, including the simple rearrangement of the steps shown in FIG. 10 or elements shown in FIG. 11. In some systems, it is possible to apply previously gathered signal features to the incoming mobile station signal instead of previously stored samples at the auxiliary base station. For example, such signal features as Doppler shift and delay may change slowly over time and, therefore, can be applied advantageously to an incoming signal without the precise time alignment achieved by storing samples.

In some embodiments, more than one reference base station may collect and distribute signal features simultaneously. For example, in FIG. 9, the base station 110B may also collect signal features which are distributed to the other auxiliary base stations. Measurement of a mobile station signal based upon creation of a replica of a signal received at a reference base station may be beneficial in other areas besides position location. For example, such measurements useful in handoff execution or loading prediction.

In the example above, the mobile station is described as a wireless voice unit. In general, the mobile station may be any type of wireless unit capable of transmitting a signal. The mobile station may be a handheld voice or data unit or both, vehicle mounted voice or data unit or both, a wireless printer, a pager or wireless meter-reading equipment just to name a few. The mobile station signal may be any type of signal including but not limited to an emergency or non-emergency voice call, a short message service signal, a location beacon, a digital data file, or a page response. Similarly, the system may be a public cellular telephone system, a wireless private branch exchange, an enhanced specialized mobile radio (ESMR) system, paging system or other wireless system in which multiple fixed location units provide coverage to a movable remote unit. The system illustrated above is controlled by a system controller and the base stations communicate by way of the system controller. In an alternative embodiment, the base stations communicate directly with one another. In such a case, it may not be necessary to include a system controller in the system.

The location parameters which may be determined by the base stations include, but are not limited to, the angle of arrival, time of arrival, time difference of arrival, multipath characterization, multipath fingerprinting, Doppler shifts, phase difference or differences in amplitude of received replicas of the signal or a combination of these.

In the preferred embodiment shown above, the auxiliary base stations are also fully functioning base stations which may service mobile stations located within the corresponding coverage area. In another embodiment, some or all of the auxiliary base stations may be limited function base stations which perform only a portion of the functions performed by a fully functioning base station. In one embodiment, the auxiliary base stations are dedicated units having a functionality limited to measurement of location parameters. The limited function auxiliary base stations need not be collocated with the system base stations.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning of equivalency of the claims are to be embraced within their scope.

What is claimed is:

1. A method of measuring transmission of a transmitter within a communication system, the method comprising the steps of:
   collecting a first set of one or more signal features of a first transmitter signal received at a first receiver wherein said first set of signal features comprises a data content of said first transmitter signal;
   forwarding said first set of signal features to a second receiver;
   creating a replica of said first transmitter signal at said second receiver in response to said first set of signal features;

correlating said replica with a second transmitter signal received at said second receiver; and determining a second set of one or more signal features for said second transmitter signal as received at said second receiver;

determining a first location parameter of said first transmitter signal in response to said first set of signal features;

determining a second location parameter of said second transmitter signal in response to said second set of signal features; and estimating a position of said transmitter in response to said first and second location parameters.

2. The method of claim 1, further comprising the step of performing error detection at said first receiver to determine said data content.

3. The method of claim 1, wherein said first set of signal features is distributed to a plurality of receivers and corresponding location parameters of said transmitter are determined and wherein said step of estimating said position of said transmitter comprises the step of estimating said position of said transmitter using said corresponding location parameters.

4. The method of claim 1, wherein said first set of signal features is determined in response to information regarding a model, type or manufacturer of said transmitter.

5. The method of claim 1, wherein said first set of signal features comprises a phase trajectory of said first transmitter signal.

6. The method of claim 1, wherein said first set of signal features comprises frequency deviations of said first transmitter signal.

7. The method of claim 1, wherein said first set of signal features comprises frequency variations along a portion of said first transmitter signal.

8. The method of claim 1, wherein said first set of signal features comprises Doppler shift information corresponding to said first transmitter signal.

9. The method of claim 1, wherein said step of correlating is carried out over a range of parameters and wherein said range of parameters is limited in response to said first set of signal features.

10. The method of claim 1, wherein said second receiver is co-located with a base station of said communication system.

11. The method of claim 10, wherein said transmitter is outside of a coverage area corresponding to said base station.

12. The method of claim 1, wherein said first transmitter signal comprises an emergency voice call.

13. The method of claim 1, wherein said first transmitter signal comprises a known location beacon.

14. An apparatus for measuring a mobile station transmission within a communication system comprising:

means for collecting a first set of one or more signal features of a first mobile station signal received at a reference base station, wherein said first set of signal features comprises a data content of said mobile station signal;

means for forwarding said first set of signal features to an auxiliary base station;

means for creating a replica of said first mobile station signal at said auxiliary base station in response to said first set of signal features;

means for correlating said replica with a second mobile station signal received at said auxiliary base station in order to determine a second set of one or more signal features for said mobile station signal as received at said auxiliary base station;

means responsive to said first set of signal features for determining a first location parameter of said first mobile station signal;

means responsive to said second set of signal features for determining a second location parameter of said second mobile station signal; and means for estimating a position of said mobile station in response to said first and second location parameters.

15. The apparatus of claim 14, wherein said reference base station performs error detection to determine said data content.

16. The apparatus of claim 14, wherein said means for correlating operates over a range of parameters and wherein said range of parameters is limited by said first set of signal features.

17. The apparatus of claim 14, wherein co-channel interference prevents said auxiliary base station from detecting and demodulating said second mobile station signal.

18. The apparatus of claim 14, wherein a low signal to noise ratio prevents said auxiliary base station from detecting and demodulating said second mobile station signal.

19. The apparatus of claim 14, wherein said auxiliary base station is co-located with a fully functioning base station of said communication system.

20. The method of claim 1, wherein said first receiver communicates with said transmitter.

21. The method of claim 1, wherein said transmitter is within a coverage area corresponding to said first receiver.

22. The method of claim 1, wherein said first receiver receives said transmitter signals at a higher signal to noise ratio than any other receiver in said communication system.

23. The apparatus of claim 16, wherein said reference base station receives said mobile station signal at a higher signal to noise ratio than any other base station in said communication system.

* * * * *